US010240996B2

(12) United States Patent
Oohara

(10) Patent No.: US 10,240,996 B2
(45) Date of Patent: Mar. 26, 2019

(54) MOTOR VIBRATION CAUSE DETERMINATION SYSTEM

(71) Applicant: FANUC CORPORATION, Yamanashi (JP)

(72) Inventor: Taku Oohara, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/848,420

(22) Filed: Dec. 20, 2017

(65) Prior Publication Data

US 2018/0209867 A1   Jul. 26, 2018

(30) Foreign Application Priority Data

Jan. 23, 2017 (JP) .................................. 2017-009497

(51) Int. Cl.
*G01M 1/14* (2006.01)
*G01H 11/08* (2006.01)
*G01H 17/00* (2006.01)

(52) U.S. Cl.
CPC .............. *G01M 1/14* (2013.01); *G01H 11/08* (2013.01); *G01H 17/00* (2013.01)

(58) Field of Classification Search
CPC .... G01M 1/14; G01M 13/028; G01M 13/045; G01H 1/003; G01H 17/00; G01H 11/08
See application file for complete search history.

(56) References Cited

U.S. PATENT DOCUMENTS 5,917,428 A * 6/1999 Discenzo ............ G01R 31/343
                                                        307/116
6,014,598 A * 1/2000 Duyar ................. G01R 31/343
                                                        701/31.9
(Continued)

FOREIGN PATENT DOCUMENTS

CN          201314870 Y      9/2009
CN          201780363 U      3/2011
(Continued)

OTHER PUBLICATIONS

Wei et al., "Type traction motor bearing vibration detection before leaving the factory", China Academic Journal Electronic Publishing House, http://www.cnki.net, Diesel Locomotive, issue 4, Apr. 15, 1998, pp. 45-48.

(Continued)

*Primary Examiner* — Helen C Kwok
(74) *Attorney, Agent, or Firm* — Studebaker & Brackett PC

(57) ABSTRACT

A motor vibration cause determination system includes: a vibration sensor unit capable of detecting vibration of the motor in a driving state, the vibration sensor unit detecting a first vibration which is vibration of the motor in a stand-alone state before shipping, a second vibration which is vibration of the motor in a stand-alone state and in a non-connection state in which the motor is not connected to the main shaft after shipping, and a third vibration which is vibration of the motor in the connection state; a vibration information storage unit that stores information on the vibration of the motor detected by the vibration sensor unit, the information including information on the first, second, and third vibrations; and a vibration cause determination unit that determines the cause of vibration occurring in the (Continued)

connection state on the basis of the vibration information stored in the vibration information storage unit.

2 Claims, 4 Drawing Sheets

(56) References Cited

U.S. PATENT DOCUMENTS

| | | | | |
|---|---|---|---|---|
| 6,260,004 | B1* | 7/2001 | Hays | G05B 23/0235 |
| | | | | 702/130 |
| 6,262,550 | B1* | 7/2001 | Kliman | G05B 23/0264 |
| | | | | 318/565 |
| 6,289,735 | B1* | 9/2001 | Dister | G01H 1/003 |
| | | | | 73/579 |
| 6,370,957 | B1* | 4/2002 | Filippenko | G01H 1/003 |
| | | | | 73/593 |
| 6,434,512 | B1* | 8/2002 | Discenzo | F16C 19/52 |
| | | | | 702/184 |
| 7,097,351 | B2* | 8/2006 | Lancon | G01M 13/028 |
| | | | | 374/141 |
| 7,539,549 | B1* | 5/2009 | Discenzo | F04D 15/0077 |
| | | | | 324/765.01 |
| 2004/0263342 | A1* | 12/2004 | Matlock | H02H 7/0822 |
| | | | | 340/648 |
| 2006/0241910 | A1* | 10/2006 | Petchenev | G05B 23/0232 |
| | | | | 702/184 |
| 2007/0067678 | A1* | 3/2007 | Hosek | G05B 23/0235 |
| | | | | 714/25 |
| 2010/0082273 | A1* | 4/2010 | Lakomiak | G05B 23/0216 |
| | | | | 702/56 |
| 2010/0082275 | A1* | 4/2010 | Borsting | F04D 15/0066 |
| | | | | 702/56 |

FOREIGN PATENT DOCUMENTS

| | | |
|---|---|---|
| CN | 102135411 A | 7/2011 |
| CN | 103115667 A | 5/2013 |
| CN | 104481903 A | 4/2015 |
| CN | 106153180 A | 11/2016 |
| DE | 69707459 T2 | 4/2002 |
| JP | H11-033879 A | 2/1999 |
| JP | 2003-315213 A | 11/2003 |
| JP | 2005-337385 A | 12/2005 |
| JP | 2016-109647 A | 6/2016 |

OTHER PUBLICATIONS

Chang Debao, "Probe into vibration problems in operation of large and medium-sized asynchronous motors", Science and Technology Forum, China Academic Journal Electronic Publishing House, http://www.cnki.net, Jiamus Electric Co., Ltd., Jiamus 154002, Heilongjiang, p. 103.

Zhu He, "Causes and fault treatment of vibration of electric motor in operation", Science and Technology Information, Laigang Group Co., Ltd. Power department Shandong 271104, Industrial Technology, China Academic Journal Electronic Publishing House, http://www.cnki.net, 2007, No. 07, p. 29.

Li Sihong et al., "Causes and treatment of vibration of asynchronous motor in operation", Shandong Lunan Cement Co., Ltd., Tengzhou 277531, Electrical technology, Sichuan Cement, No. 4, 2005, pp. 48-49.

Huang, "Probe into vibration problems in operation of large and medium-sized asynchronous motors", Jiangxi Electric Power, vol. 28, Year 2004, Article No. 1006-348X (2004) Mar. 17, 2003, Jiangxi Xinyu Power Generation Co., Ltd., Xinyu, Jiangxi 338002, pp. 17-19.

A First Office Action issued by the State Intellectual Property Office dated Sep. 28, 2018, which corresponds to Chinese Patent Application No. 201810031119.3 and is related to U.S. Appl. No. 15/848,420 with English Translation.

An Office Action issued by the German Patent Office dated Sep. 18, 2018, which corresponds to German Patent Application No. 102017011889.2 and is related to U.S. Appl. No. 15/848,420.

* cited by examiner

MOTOR VIBRATION CAUSE DETERMINATION SYSTEM

This application is based on and claims the benefit of priority from Japanese Patent Application No. 2017-009497, filed on 23 Jan. 2017, the content of which is incorporated herein by reference.

BACKGROUND OF THE INVENTION

Field of the Invention

The present invention relates to a motor vibration cause determination system for determining the causes of vibration occurring in a state in which a main shaft is connected to a motor.

Related Art

Conventionally, for example, a motor which is a driving source of a machining device or the like is shipped and delivered from a motor manufacturing plant, and is connected to a main shaft in a machining device assembling plant. For example, a motor and a main shaft are connected directly by a coupling or the like or is connected indirectly by a gear, a belt, or the like.

In a connection state in which the motor and the main shaft are connected, abnormal vibration which is caused by an imbalance between respective components, a centering defect between the motor and the main shaft, a defect in the motor bearings, and the like may occur. In a machining device and the like, it is necessary to find out the cause of abnormal vibration and to perform adjustment so that the abnormal vibration is eliminated.

In contrast, a technology of providing means for detecting vibration in a main shaft, for example, to detect vibration and determining whether the vibration is within an allowable range is disclosed (for example, see Patent Document 1). Moreover, a technology of detecting a shaft run-out of a rotating shaft using shaft vibration measurement means and adjusting a rotating shaft connecting joint is disclosed (for example, see Patent Document 2).

Patent Document 1: Japanese Unexamined Patent Application, Publication No. H11-33879

Patent Document 2: Japanese Unexamined Patent Application, Publication No. 2005-337385

SUMMARY OF THE INVENTION

However, there is a problem that, when there are a plurality of causes of abnormal vibration, the above-mentioned technologies cannot find out anything but a specific cause only. There is another problem in that it is necessary to examine respective components in order to find out the cause of abnormal vibration and it takes a considerable amount of time to identify the vibration cause.

An object of the present invention is to provide a vibration factor determination system capable of easily determining the cause of vibration occurring in a state in which a main shaft is connected to a motor.

(1) The present invention provides a motor vibration cause determination system (for example, a motor vibration cause determination system 10, 10A to be described later) that determines the cause of vibration occurring in a connection state in which a motor (for example, a motor 40 to be described later) is directly or indirectly connected to a main shaft (for example, a main shaft 20 to be described later), including: a vibration sensor unit (for example, a vibration sensor unit 12, 12A to be described later) capable of detecting vibration of the motor in a driving state, the vibration sensor unit detecting a first vibration which is vibration of the motor in a stand-alone state before shipping, a second vibration which is vibration of the motor in a stand-alone state and in a non-connection state in which the motor is not connected to the main shaft after shipping, and a third vibration which is vibration of the motor in the connection state; a vibration information storage unit (for example, a vibration information storage unit 13, 13A to be described later) that stores information on the vibration of the motor detected by the vibration sensor unit, the information including information on the first vibration, information on the second vibration, and information on the third vibration; and a vibration cause determination unit (for example, a vibration cause determination unit 14, 14A to be described later) that determines the cause of vibration occurring in the connection state on the basis of the first vibration information, the second vibration information, and the third vibration information stored in the vibration information storage unit.

(2) In the motor vibration cause determination system according to (1), the vibration sensor unit and the vibration information storage unit may be disposed with the motor.

According to the present invention, it is possible to provide a vibration factor determination system capable of easily determining the cause of vibration occurring in a state in which a main shaft is connected to a motor.

DETAILED DESCRIPTION OF THE INVENTION

Figure 1:
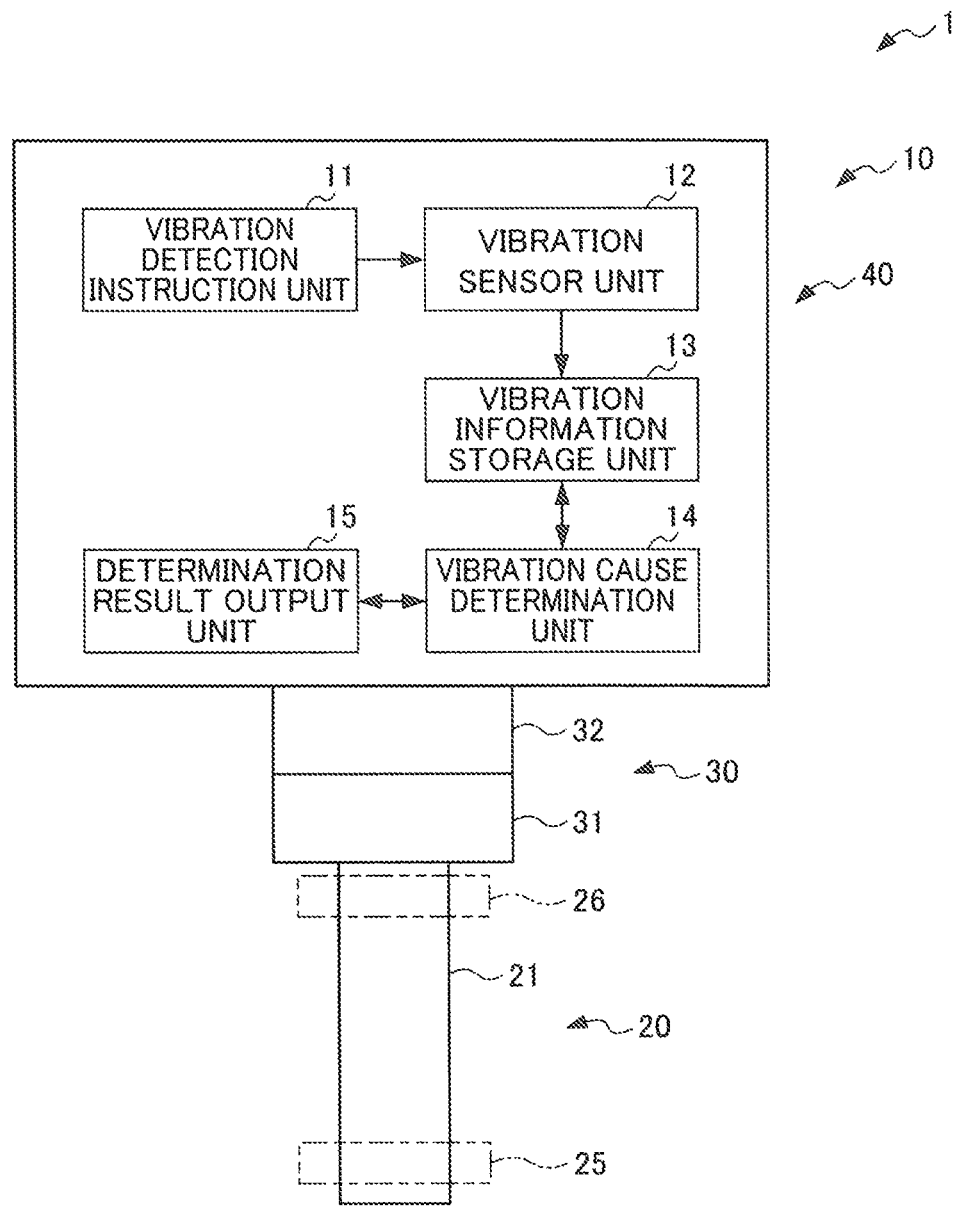
FIG. 1 is a schematic diagram for describing a configuration of a motor vibration cause determination system according to a first embodiment.

Hereinafter, embodiments of the present invention will be described with reference to the drawings. In the description of the second and subsequent embodiments, the same constituent members as those of the first embodiment will be denoted by the same reference numerals and the description thereof will be omitted.

First Embodiment

First, a configuration of a machining device 1 including a motor vibration cause determination system 10 according to a first embodiment will be described with reference to FIG. 1. FIG. 1 is a schematic diagram for describing a configuration of a motor vibration cause determination system according to the first embodiment.

As illustrated in FIG. 1, the machining device 1 includes a main shaft 20, a connector 30, a motor 40, and a motor vibration cause determination system 10. Moreover, the motor vibration cause determination system 10 includes a vibration detection instruction unit 11, a vibration sensor unit 12, a vibration information storage unit 13, a vibration cause determination unit 14, and a determination result output unit 15.

The machining device 1 of the first embodiment has a direct connection shape in which the motor 40 and the main shaft 20 are connected directly by a connector 30 such as a coupling. Moreover, the motor vibration cause determination system 10 of the first embodiment has an integrated shape in which all constituent members are disposed with the motor 40. A shape in which the motor 40 and the main shaft 20 are connected indirectly by a gear, a belt, or the like will be described as a second embodiment, and a shape in which a portion of the vibration sensor unit 12 or the vibration cause determination unit 14 is disposed outside the motor 40 will be described as a third embodiment.

The main shaft 20 includes a main shaft rotor 21, main shaft bearings 25 and 26, and a main shaft-side coupling 31 that forms a portion of the connector 30. The main shaft rotor 21 is a member that rotates in response to a rotational driving force transmitted from the motor 40. The main shaft bearings 25 and 26 are members disposed near both ends in an axial direction of the main shaft rotor 21 so as to rotatably support the main shaft rotor 21. The main shaft-side coupling 31 is a member disposed at an end of the main shaft rotor 21 close to the motor 40 so as to connect the main shaft rotor 21 and the motor 40 directly in cooperation with a motor-side coupling 32 to be described later.

The connector 30 includes the main shaft-side coupling 31 and the motor-side coupling 32. The connector 30 is a member that connects the main shaft rotor 21 (the main shaft) and the motor 40. In the present embodiment, although the connector 30 is configured as a coupling that directly connects the main shaft rotor 21 and the motor 40, the present invention is not limited to this but the connector 30 may be configured as a gear, a belt, or the like as described above.

The motor 40 is a driving source that rotates the main shaft rotor 21 (the main shaft) connected via the connector 30. The motor 40 is manufactured in a motor manufacturing plant, for example, and is shipped (delivered) to an assembling plant of the machining device 1. After the motor 40 is delivered to the assembling plant of the machining device 1, the motor 40 is connected to the main shaft 20. Moreover, the motor 40 is a target of which vibration is detected in the present embodiment. Vibration of the motor 40 in a driving state is detected at least in a state before shipping (before delivery), a non-connection state in which the motor 40 is not connected to the main shaft 20 after shipping (after delivery), and a connection state in which the motor 40 is connected to the main shaft 20.

The time point of "before shipping" and "after shipping" is typically the time point before and after the motor 40 is delivered for shipping. Although shipping is typically performed between different business operators, the present invention is not limited to this, but shipping includes delivery between different plants of the same business operator, for example.

[Details of Motor Vibration Cause Determination System 10]

The vibration detection instruction unit 11 instructs the vibration sensor unit 12 to detect vibration of the motor 40. The vibration detection instruction unit 11 is configured to be able to receive a detection instruction from the outside of the motor vibration cause determination system 10, for example, and output a vibration detection instruction to the vibration sensor unit 12 upon receiving a detection instruction from the outside.

The vibration sensor unit 12 is configured to be able to detect vibration of the motor 40 in a driving state. The vibration sensor unit 12 is configured as one or a plurality of vibration sensors. The vibration sensor unit 12 may be configured as a contact-type vibration sensor and may be configured as a non-contact-type vibration sensor. In the present embodiment, the vibration sensor unit 12 is configured as one contact-type sensor included in the motor 40.

The vibration sensor unit 12 detects at least a first vibration which is vibration of the motor 40 in a stand-alone state at least before shipping (before delivery), a second vibration which is vibration of the motor 40 in the stand-alone state and in a non-connection state in which the motor 40 is not connected to the main shaft rotor 21 (the main shaft) after shipping (after delivery), and a third vibration which is vibration of the motor 40 in a connection state. The vibration sensor unit 12 outputs information on the detected respective vibrations to the vibration information storage unit 13.

The "non-connection state in which the motor 40 is not connected to the main shaft rotor 21 (the main shaft) after shipping (after delivery)" includes a case in which a user (for example, a user in a machining device assembling plant) of the motor 40 has adjusted the vibration of the motor 40 alone. Moreover, in the connection state, the vibration of the motor 40 includes vibration of the main shaft 20 or the like.

The vibration information storage unit 13 stores information (hereinafter also referred to as "vibration information") of vibration of the motor 40 detected by the vibration sensor unit 12. The vibration information storage unit 13 stores the vibration information output from the vibration sensor unit 12. The vibration information storage unit 13 stores at least information on the first vibration, information on the second vibration, and information on the third vibration.

The vibration cause determination unit 14 determines the cause of vibration occurring in the connection state on the basis of the first vibration information, the second vibration information, and the third vibration information stored in the vibration information storage unit 13. The vibration cause determination unit 14 determines (specifies) the cause of abnormal vibration in the connection state on the basis of the vibration information of the motor 40 in the stand-alone state and the connection state.

The vibration cause determination unit 14 determines that the cause of the vibration in the connection state is any one or more of: an imbalance between components (hereinafter referred to as "main shaft-side components") of the main shaft 20; a centering defect between the main shaft 20 and the motor 40; an imbalance of the motor 40; and a bearing defect of the motor 40 in the connection state. For example, the vibration cause determination unit 14 determines the cause of the vibration in the connection state on the basis of whether a component of vibration that occurs once with every rotation of the motor 40 (hereinafter also referred to as "single-rotation-vibration component") is a main component of a vibration frequency. The "an imbalance" is typically a case in which dimensions and assembling accuracy of components are satisfactory but the components are not well-balanced and adjustment of balance is necessary.

Further, the vibration cause determination unit 14 compares the amplitudes of the first and second vibrations and specifies the second or third vibration as an analysis target. Moreover, the vibration cause determination unit 14 determines the cause of the vibration as the analysis target in the connection state on the basis of whether the single-rotationvibration component of the second or third vibration of the motor 40 is a main component of the vibration frequency. A further detailed operation will be described when describing the operation of the motor vibration cause determination system 10 to be described later. Here, it is preferable that the information on the second or third vibration which is the analysis target is subjected to a noise removing process.

The determination result output unit 15 is configured to be able to output a determination result (vibration cause) obtained by the vibration cause determination unit 14 to the outside of the motor vibration cause determination system 10. In the present embodiment, the determination result output unit 15 may be configured as a small display unit, a plurality of light emitting units or audio output units, or the like, for example. The determination result output unit 15 is configured to inform the outside (for example, an operator) of the cause of the abnormal vibration in the connection state in which the motor 40 and the main shaft 20 are connected. Moreover, the operator can perform an adjustment operation for eliminating the vibration cause by ascertaining the vibration cause output by the determination result output unit 15.

Figure 2:
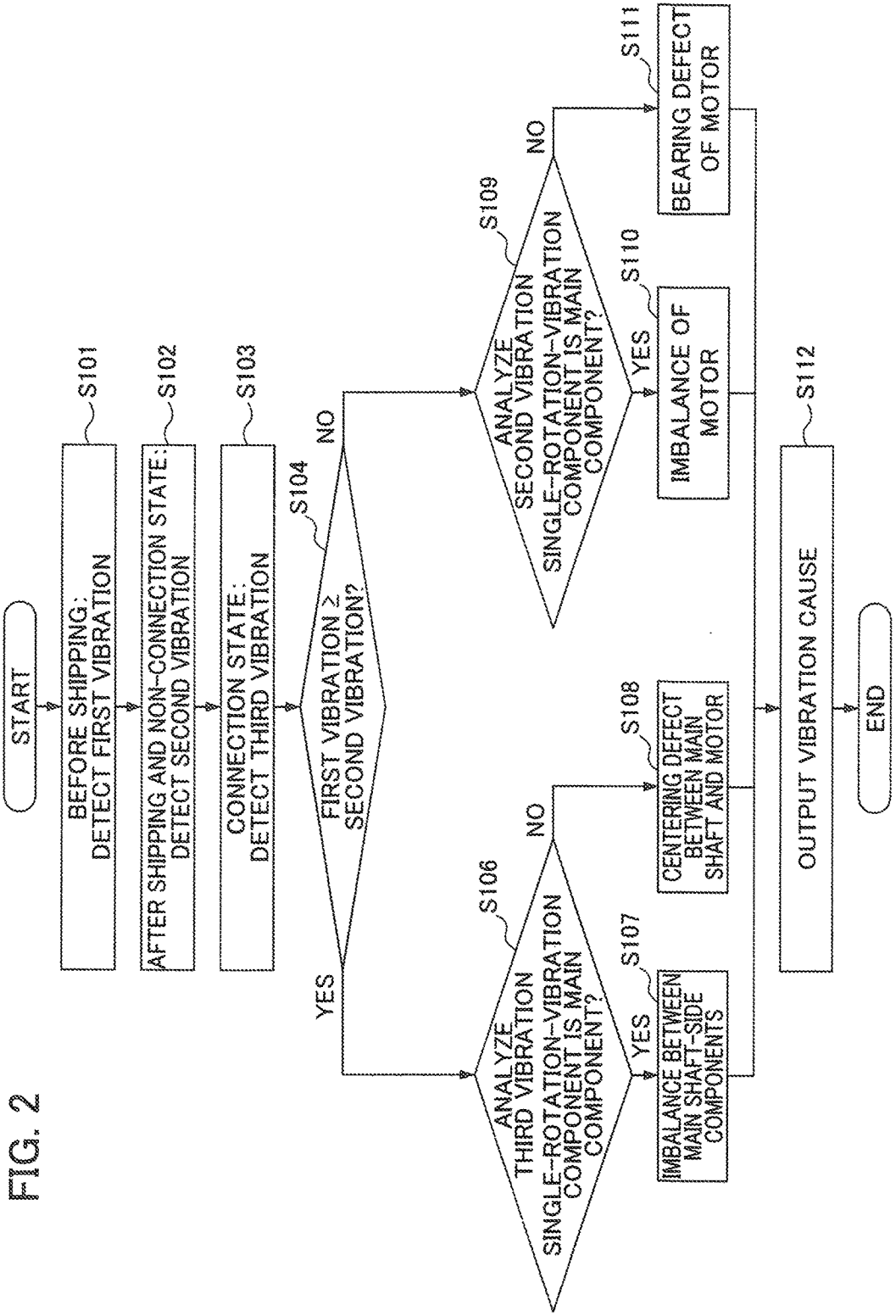
FIG. 2 is a flowchart for describing an operation of the motor vibration cause determination system according to the first embodiment.

Subsequently, an operation of the motor vibration cause determination system according to the first embodiment will be described with reference to FIG. 2. FIG. 2 is a flowchart for describing an operation of the motor vibration cause determination system according to the first embodiment.

First, in step S101, the vibration sensor unit 12 detects a first vibration which is vibration of the motor 40 in a stand-alone state before shipping (before delivery). Specifically, before shipping, an operator instructs the vibration sensor unit 12 to detect vibration with the aid of the vibration detection instruction unit 11. The vibration sensor unit 12 having received a vibration detection instruction detects the first vibration and outputs information on the first vibration to the vibration information storage unit 13. Moreover, the vibration information storage unit 13 stores the first vibration information.

Subsequently, in step S102, the vibration sensor unit 12 detects a second vibration which is vibration of the motor 40 in a stand-alone state and in a non-connection state in which the motor 40 is not connected to the main shaft 20 after shipping (after delivery). Specifically, for example, immediately before connection of the motor 40 and the main shaft 20, the operator instructs the vibration sensor unit 12 to detect vibration with the aid of the vibration detection instruction unit 11. The vibration sensor unit 12 having received the vibration detection instruction detects the second vibration and outputs the information on the second vibration to the vibration information storage unit 13. Moreover, the vibration information storage unit 13 stores the second vibration information. Here, "immediately before connection" may be a time point which is a long period earlier than the connection (for example, before the motor is stored for several days in a warehouse) unless there is a change in vibration conditions.

Subsequently, in step S103, the vibration sensor unit 12 detects a third vibration which is vibration of the motor 40 in the connection state. Specifically, for example, after connecting the motor 40 and the main shaft 20, the operator instructs the vibration sensor unit 12 to detect vibration with the aid of the vibration detection instruction unit 11. The vibration sensor unit 12 having received the vibration detection instruction detects the third vibration and outputs information on the third vibration to the vibration information storage unit 13. Moreover, the vibration information storage unit 13 stores the third vibration information.

Subsequently, in step S104, the vibration cause determination unit 14 compares the first and second vibrations on the basis of the first vibration information and the second vibration information stored in the vibration information storage unit 13. The vibration cause determination unit 14 proceeds to step S106 when the amplitude of the first vibration is equal to or higher than the amplitude of the second vibration (YES) and proceeds to step S109 when the amplitude of the first vibration is not equal to or higher than the amplitude of the second vibration (NO). This is because a state in which the amplitude of the first vibration is not equal to or higher than the amplitude of the second vibration (a state in which the amplitude of the first vibration is lower than the amplitude of the second vibration) often results from the fact that a vibration cause is attributable to the motor 40 after shipping (after delivery) due to a defect occurring during delivery.

In steps subsequent to step S104, when it is determined that a vibration cause is not attributable to the motor 40 after shipping (after delivery), the third vibration is analyzed by predicting that the vibration cause is attributable to an imbalance of main shaft-side components or a centering defect between the main shaft 20 and the motor 40. On the other hand, when it is determined that the vibration cause is attributable to the motor 40 after shipping (after delivery), the second vibration is analyzed.

Subsequently, in step S106, the vibration cause determination unit 14 analyzes the third vibration. The vibration cause determination unit 14 determines whether the single-rotation-vibration component of the third vibration is a main component of the vibration frequency.

When the single-rotation-vibration component is the main component (YES), the vibration cause determination unit 14 determines that the vibration cause in the connection state is an imbalance of main shaft-side components in step S107. This is because, when a vibration component occurs once every rotation, an imbalance of main shaft-side components is often attributable to the single-rotation-vibration component.

When the single-rotation-vibration component is not the main component (NO), the vibration cause determination unit 14 determines that a vibration cause in the connection state is a centering defect between the main shaft 20 and the motor 40 in step S108. This is because, when a plurality of vibration components occur with every rotation, a centering defect is often the cause of vibration.

After step S107 or S108 is performed, the vibration cause determination unit 14 outputs the vibration cause to the determination result output unit 15 on the basis of the determination result output from the vibration cause determination unit 14 in step S112. After that, the process ends.

On the other hand, in step S109, which is executed when the result of determination made in step S104 is NO, the vibration cause determination unit 14 analyzes the second vibration. The vibration cause determination unit 14 determines whether a single-rotation-vibration component of the second vibration is a main component of the vibration frequency.

When the single-rotation-vibration component is the main component (YES), the vibration cause determination unit 14 determines that the vibration cause in the connection state is an imbalance of the motor 40 in step S110. This is because, when a vibration component occurs once with every rotation, an imbalance of the motor 40 is often attributable to the single-rotation-vibration component.

Moreover, when a vibration component occurring once with every rotation of the motor is not the main component (NO), the vibration cause determination unit 14 determines that the vibration cause in the connection state is a bearing defect of the motor 40 in step S111. This is because, when a plurality of vibration components occur with every rotation, a bearing defect is often the cause of vibration. It is thought that a bearing defect of the motor 40 often occurs during delivery. Moreover, a bearing defect of the main shaft 20 may be one of the causes of vibration.

After step S110 or S111 is performed, the vibration cause determination unit 14 outputs the vibration cause to the determination result output unit 15 on the basis of the determination result output from the vibration cause determination unit 14 in step S112. After that, the process ends.

After step S112 is performed, the operator can ascertain the content of the vibration cause output by the determination result output unit 15 and perform adjustment so that the vibration cause is eliminated.

Advantages of First Embodiment

According to the present embodiment, the following advantages are obtained. According to the present embodiment, it is possible to provide the motor vibration cause determination system 10 capable of easily determining the cause of vibration occurring in a connection state in which the main shaft 20 is connected to the motor 40.

Specifically, the motor vibration cause determination system 10 of the present embodiment includes: the vibration sensor unit 12 capable of detecting vibration of the motor 40 in the driving state, the vibration cause determination unit 12 detecting the first vibration which is vibration of the motor 40 in a stand-alone state before shipping, the second vibration which is vibration of the motor 40 in a stand-alone state in a non-connection state in which the motor 40 is not connected to the main shaft 20 after shipping, and the third vibration which is vibration of the motor 40 in a connection state; the vibration information storage unit 13 that stores information on the vibration of the motor 40 detected by the vibration sensor unit 12, the information including information on the first vibration, information on the second vibration, and information on the third vibration; and the vibration cause determination unit 14 that determines a cause of vibration occurring in the connection state on the basis of the first vibration information, the second vibration information, and the third vibration information stored in the vibration information storage unit 13.

Due to this, the motor vibration cause determination system 10 can determine the cause of the vibration occurring in the connection state in which the motor 40 and the main shaft 20 are connected on the basis of the vibration information of the motor 40 in each vibration state. Moreover, the motor vibration cause determination system 10 can identify the vibration cause by taking a plurality of causes into consideration rather than identifying the presence of a specific cause. Furthermore, the motor vibration cause determination system 10 can identify the vibration cause without requiring an operation of examining the vibration causes of respective components. Furthermore, the motor vibration cause determination system 10 can identify the vibration cause in a short time.

According to the present embodiment, the vibration sensor unit 12 and the vibration information storage unit 13 are disposed with the motor 40. Due to this, it is possible to provide the motor vibration cause determination system 10 which is integrated with the motor 40. Therefore, it is possible to easily identify the vibration causes of respective motors 40.

According to the present embodiment, the vibration cause determination unit 14 determines that the cause of the vibration in the connection state is any one or more of: an imbalance between main shaft-side components; a centering defect between the main shaft 20 and the motor 40; an imbalance of the motor 40; and a bearing defect of the motor 40. Due to this, the motor vibration cause determination system 10 can identify a major vibration cause among a plurality of vibration causes. Moreover, the motor vibration cause determination system 10 can identify the vibration cause so that an adjustment operation of eliminating the vibration cause can be performed easily.

According to the present embodiment, the vibration cause determination unit 14 determines the cause of the vibration in the connection state on the basis of whether a vibration component (single-rotation-vibration component) that occurs once with every rotation of the motor is a main component of the vibration frequency. Due to this, the motor vibration cause determination system 10 can identify the vibration cause in more detail. Moreover, the motor vibration cause determination system 10 can determine the vibration cause easily and accurately.

Second Embodiment

Figure 3:
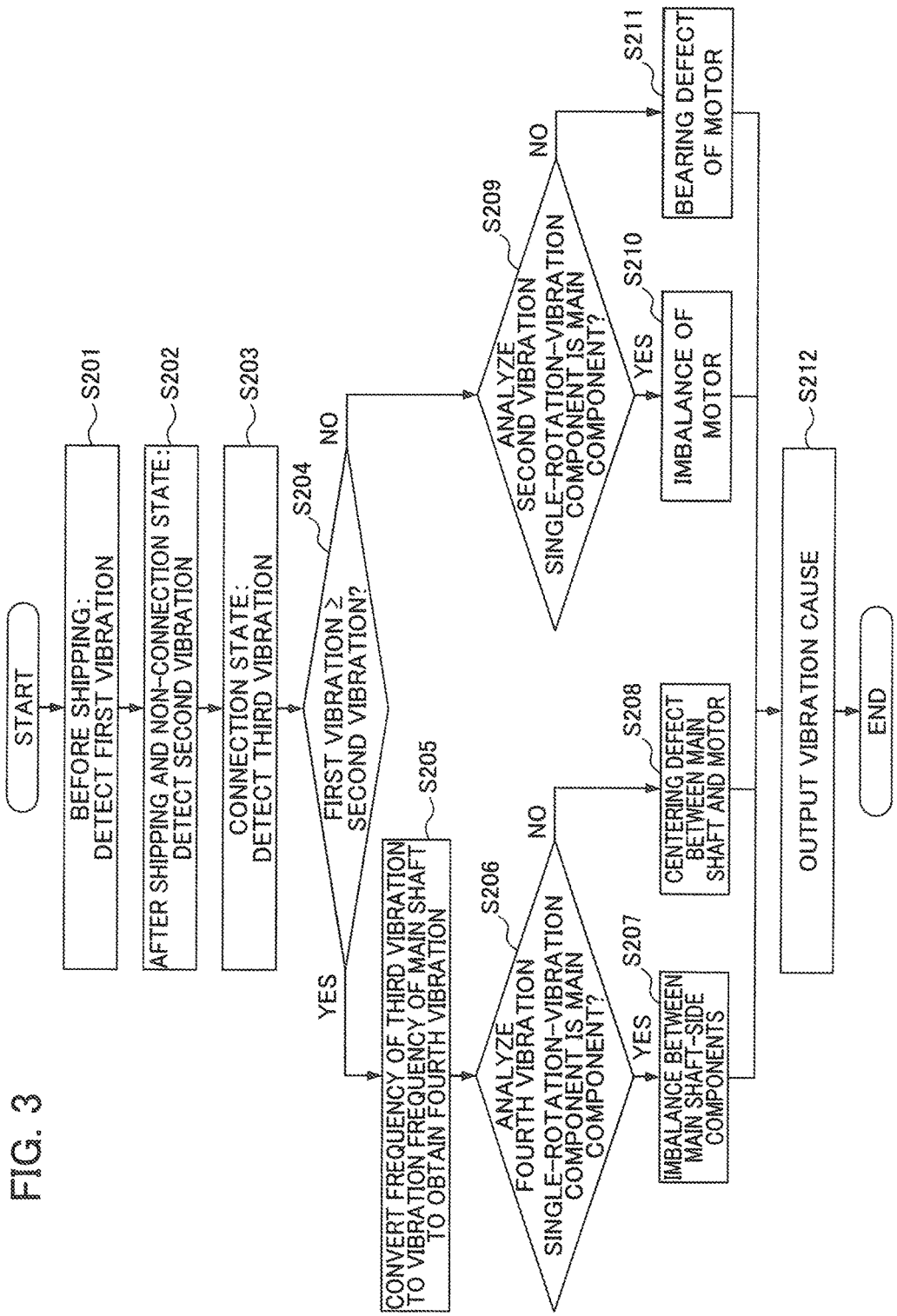
FIG. 3 is a flowchart for describing an operation of a motor vibration cause determination system according to a second embodiment.

An operation of a motor vibration cause determination system according to a second embodiment will be described with reference to FIG. 3. FIG. 3 is a flowchart for describing an operation of the motor vibration cause determination system according to the second embodiment. The second embodiment determines the cause of vibration in a connection state in which the main shaft 20 and the motor 40 are connected indirectly by a gear, a belt, or the like. Hereinafter, constituent members different from those of the first embodiment will be described mainly and the description of the same constituent members as those of the first embodiment will be omitted.

First, steps S201 to S204 are the same as steps S101 to S104 of the first embodiment, and the description thereof will be omitted. Subsequently, in step S205, the vibration cause determination unit 14 converts the frequency of the third vibration to a vibration frequency of the main shaft 20. Specifically, the vibration cause determination unit 14 multiplies the frequency of the third vibration by a gear ratio or a belt ratio to calculate a fourth vibration converted to the vibration frequency of the main shaft. Moreover, the "non-connection state in which the motor 40 is not connected to the main shaft rotor 21 (the main shaft) after shipping (after delivery)" associated with the second vibration is a state in which one gear is attached to an output shaft of the motor 40 when the connection is realized by gears and a state in which a pulley is attached to the output shaft of the motor 40 when the connection is realized by a belt.

Subsequently, in step S206, the vibration cause determination unit 14 analyzes the calculated fourth vibration. The vibration cause determination unit 14 determines whether a vibration component (single-rotation-vibration component) of the fourth vibration that occurs once every rotation of the motor is a main component of the vibration frequency.

When the single-rotation-vibration component is the main component (YES), the vibration cause determination unit 14 determines that the vibration cause in the connection state is an imbalance of main shaft-side components in step S207.

When the single-rotation-vibration component is not the main component (NO), the vibration cause determination unit 14 determines that a vibration cause in the connection state is a centering defect between the main shaft 20 and the motor 40 in step S208.

Steps S209 to S212 are the same as steps S109 to S112 of the first embodiment, and the description thereof will be omitted.

According to the second embodiment, the same advantages as those of the first embodiment are obtained even when the main shaft 20 and the motor 40 are connected indirectly.

Third Embodiment

Figure 4:
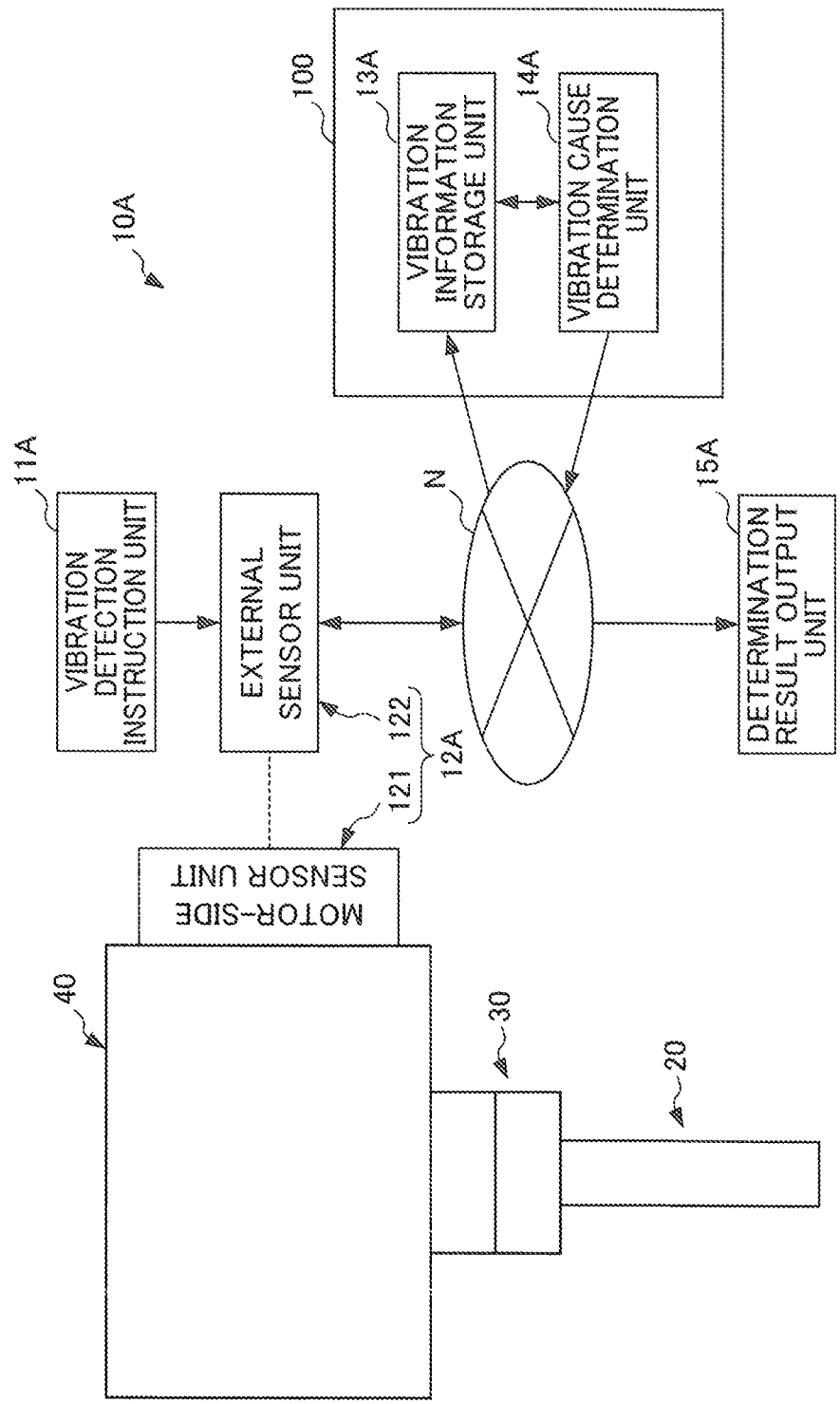
FIG. 4 is a schematic diagram for describing a configuration of a motor vibration cause determination system according to a third embodiment.

An operation of a motor vibration cause determination system according to a third embodiment will be described with reference to FIG. 4. FIG. 4 is a flowchart for describing an operation of the motor vibration cause determination system according to the third embodiment. The motor vibration cause determination system of the third embodiment has a non-integrated shape in which the system is not integrated with the motor. Hereinafter, constituent members different from those of the first embodiment will be described mainly and the description of the same constituent members as those of the first embodiment will be omitted.

As illustrated in FIG. 4, a motor vibration cause determination system 10A according to the third embodiment is configured such that a portion thereof is separated from the motor 40. In the present embodiment, the motor vibration cause determination system 10A includes a vibration detection instruction unit 11A, a vibration sensor unit 12A, a server 100, and a determination result output unit 15A. The vibration sensor unit 12A, the server 100, and the determination result output unit 15A are connected to each other by a communication network N. The vibration sensor unit 12A includes a motor-side sensor unit 121 and an external sensor unit 122. The server 100 includes a vibration information storage unit 13A and a vibration cause determination unit 14A.

The motor-side sensor unit 121 is a sensor unit disposed with the motor 40 and is included in the motor 40 or externally attached to the motor 40. The motor-side sensor unit 121 may be constantly attached to the motor 40 or may be attached to the motor 40 when determining the vibration cause only. The external sensor unit 122 may be configured as a vibration sensor disposed in a motor manufacturing plant before shipping (before delivery), for example, a vibration sensor disposed in a machining device assembling plant, or the like. The vibration sensor unit 12A detects vibration of the motor 40 in each vibration state and outputs information on the detected vibration to the vibration information storage unit 13A included in the server 100 via the communication network N.

The vibration information storage unit 13A receives information on the first vibration, information on the second vibration, information on the third information output from the vibration sensor unit 12A via the communication network N and stores the received respective pieces of vibration information.

The vibration cause determination unit 14A analyzes the respective pieces of vibration information similarly to the first or second embodiment and determines the cause of the vibration in the connection state in which the main shaft 20 and the motor 40 are connected. The vibration cause determination unit 14A outputs the determination result (the vibration cause) to the determination result output unit 15A via the communication unit N.

The determination result output unit 15A is disposed in a plant (the machining device assembling plant) in which the main shaft 20 and the motor 40 are connected, for example. The determination result output unit 15A receives information on the determination result (the vibration cause) output from the vibration cause determination unit 14A and outputs (for example, displays) the content of the received vibration cause to the outside via the communication network N.

According to the third embodiment, the following advantages, for example, in addition to the advantages of the first and second embodiments are obtained. According to the third embodiment, since the motor vibration cause determination system 10A does not require a portion of the vibration sensor unit or the vibration information storage unit to be provided in respective motors, it is possible to reduce the number of vibration sensor units or vibration information storage units (components) used in the motor vibration cause determination system 10A. According to the present embodiment, since the server 100 on the Internet can store the vibration information and determine the vibration cause, the motor vibration cause determination system 10A can perform vibration detection and vibration cause determination in parallel in a plurality of plants. According to the present embodiment, the vibration information and the information on the vibration cause can be acquired in any place. According to the present embodiment, it is possible to easily accumulate the vibration information and the information on the vibration cause.

While the first to third embodiments have been described, the present invention is not limited to these embodiments. Naturally, modifications and improvements made within a range where the object of the present invention can be achieved fall within the scope of the present invention. For example, arrangement of constituent members of the motor vibration cause determination system is not particularly limited. A portion of the constituent members may be disposed in the motor, another portion of the constituent members may be disposed in a plant or the like, and still another portion of the constituent members may be disposed in the server. The main shaft-side component includes a coupling used for direct connection, a gear used for gear-based connection, a pulley used for belt-based connection in addition to the main shaft 20.

EXPLANATION OF REFERENCE NUMERALS

1: Machining device
10, 10A: Motor vibration cause determination system
20: Main shaft
30: Connector
40: Motor
11, 11A: Vibration detection instruction unit
12, 12A: Vibration sensor unit
13, 13A: Vibration information storage unit
14, 14A: Vibration cause determination unit
15, 15A: Determination result output unit

What is claimed is:

1. A motor vibration cause determination system that determines the cause of vibration occurring in a connection state in which a motor is directly or indirectly connected to a main shaft, comprising:
   a vibration sensor unit capable of detecting vibration of the motor in a driving state, the vibration sensor unit detecting a first vibration which is vibration of the motor in a stand-alone state before shipping, a second vibration which is vibration of the motor in a stand-alone state and in a non-connection state in which the motor is not connected to the main shaft after shipping, and a third vibration which is vibration of the motor in the connection state;

a vibration information storage unit that stores information on the vibration of the motor detected by the vibration sensor unit, the information including information on the first vibration, information on the second vibration, and information on the third vibration; and a vibration cause determination unit that:
  determines whether a cause of vibration, occurring in the connection state, originated in the connection state or the non-connection state, on the basis of the first vibration information, the second vibration information, and the third vibration information stored in the vibration information storage unit; and
  determines the cause of the vibration occurring in the connection state on the basis of whether the cause of vibration originated in the connection state or the non-connection state.

2. The motor vibration cause determination system according to claim 1, wherein the vibration sensor unit and the vibration information storage unit are disposed with the motor.

\* \* \* \* \*